Figure 1:
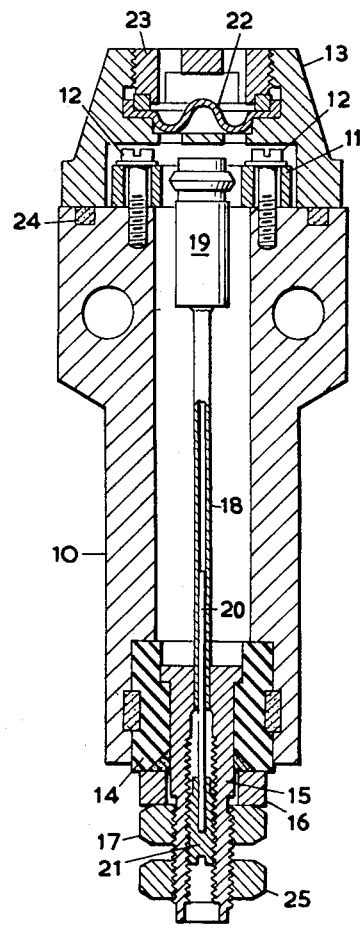

May 31, 1960   B. F. SWANWICK   2,938,973
MASS-ACTUATED ELECTRIC SWITCHING DEVICES
Filed March 20, 1958

Inventor:
Barry Frederick Swanwick
By
Stevens, Davis, Miller & Mosher
Attorneys

United States Patent Office 2,938,973
Patented May 31, 1960

2,938,973
MASS-ACTUATED ELECTRIC SWITCHING DEVICES

Barry Frederick Swanwick, Hitchin, England, assignor to The English Electric Company Limited, London, England, a British company Filed Mar. 20, 1958, Ser. No. 722,777

Claims priority, application Great Britain Mar. 27, 1957

6 Claims. (Cl. 200—61.48)

This invention relates to mass-actuated electric switching devices, that is to say, to electric switching devices that include a resiliently-mounted body whose movement relative to a fixed part of the device due to gravitational forces or to inertia effects is utilized to effect a switching operation.

According to the invention, a mass-actuated electric switching device includes a body resiliently supported by a hollow cantilever spring so that a contact surface carried by or forming part of the said body or the said spring can make or break contact, on transverse deflection of the said spring, with a fixed contact of the device, the stiffness of the said spring being modified by a stiffening member extending within it through a non-deflecting portion of the said spring into a flexible portion thereof, at least the end of the said member that is within the said flexible portion being a close fit within the spring. The stiffening member may be located relative to the spring by a threaded member, connected with or forming part of the said stiffening member, situated beyond the said non-deflecting part of the said spring and co-operating with a threaded part fixed relative to the spring. Such an arrangement enables the position of the said stiffening member within the said spring to be varied thus varying the deflection characteristic of the spring system; and in fact a further feature of the present invention consists generally in the provision, in a device embodying the said first feature of the invention, of means capable of permitting the variation of the position of the said stiffening member within the said spring.

According to a preferred arrangement, a mass-actuated switching device includes a contact ring and a body supported within the said ring by means of a hollow cantilever spring of circular cross-section, within which a close-fitting rod or wire extends from its anchored end for a length which can be varied by rotating a threaded plug, arranged co-axially with the said rod or wire and attached thereto, within a threaded fixed part of the device.

The switching device according to the invention may constitute, according to its function in a particular application, either an accelerataion-responsive or inertia switch or an attitude-responsive or gravity switch. The invention was however devised as an acceleration-limiting switch, arranged to close its contacts when subjected to accelerations, in the plane of movement of the said body, exceeding a predetermined value, and particularly applicable to mounting on an airframe or the like for detecting excessive accelerations during flight. In such an application the device requires to be accurately calibrated: and the said stiffening member provides a means by which the characteristics of the device, determined primarily by the dimensions of the components, can be modified to achieve the necessary accuracy.

The device preferably includes a casing surrounding the moving parts and completely filled by a damping medium such as a silicone oil.

Figure 2:
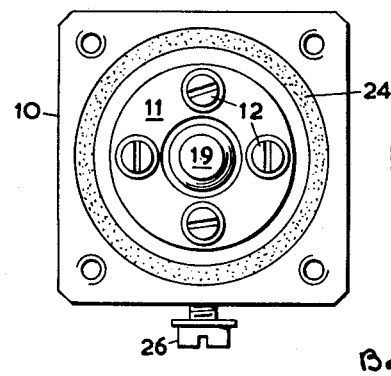

The foregoing and other features of the invention will be evident from the following description of a mass-actuated switching device embodying the invention in its preferred form. In the accompanying drawing, to which the description refers, Fig. 1 is a sectional view of the device in an axial plane, and Fig. 2 is an end view of the device with the casing end cap removed.

In the drawing, reference 10 denotes the die-cast metal barrel of the device, having a cylindrical bore closed at one end and opening at the other end on to an accurately plane surface normal to the axis of the device. A ring contact 11 is secured by screws 12 to the end face of the barrel, and an end cap 13 also secured to the end face closes the bore at this end. The closure at the other end of the barrel comprises an insulating bush 14 through which a shouldered, threaded brass bush 15 is clamped by a washer 16 and a nut 17.

A cantilever spring 18 in the form of a hard-drawn steel tube of circular cross-section is sweated or otherwise secured at one end within a hole drilled axially in the brass bush 15 and extends up the bare of the barrel 10. Its free end is similarly secured within an axial hole in a brass contact bob 19, which when the spring 18 is not deflected lies centrally within the ring contact 11 without touching it at any point. When the device is subjected to an acceleration, in a direction normal to its axis, the spring 18 is deflected; and when the acceleration reaches a certain predetermined value, the contact bob 19 touches the ring contact 11, and completes the electrical circuit through the device. The limiting value of acceleration at which contact is made is determined by the mass of the bob 19, the clearance between the bob and the ring contact 11, and the deflection characteristic of the spring 18. The device shown in the drawing is designed to complete its electrical circuit when subjected to a transverse acceleration of 10 G or more, where G is the value of acceleration due to gravity. The device is thus (according to the distinction previously made) an acceleration-responsive or inertia switch rather than a gravity switch, since the weight of the bob 19 would be insufficient to close the electrical circuit when the device is at rest with its axis horizontal.

A particular application for the device is the protection of an airframe by which it is carried against damage resulting from too-rapid maneuvering. The device is arranged to actuate, usually through relays, an alarm or control circuit when the transverse acceleration of the vehicle reaches its predetermined limiting value.

The calibration of the device depends, as already stated, in part on the clearance between the contact ring 11 and the bob 19 in its central position and in part also on the deflection characteristic of the spring 18. It is convenient roughly to determine the calibration by the use of a ring contact 11 of appropriate internal diameter, and to ensure accurate calibration by modifying the deflection characteristic of the spring by means of a stiffening member, in the form of a steel wire 20, extending within the hollow spring. The wire 20 is copper-plated and is as close a fit as possible within the spring, individual springs and wires being selectively matched together during assembly of the device: for the wire 20 to exercise a uniform effect on the stiffness of the spring 18 in all planes of deflection, at least the end part of the wire must have negligible freedom for transverse movement within the spring.

The wire 20 is not secured to the spring but extends through its anchored, non-deflecting end portion into a tapped axial hole in the brass bush 15. A threaded plug 21 is screwed into this hole and is secured to the end of the wire 20, so that the position of the wire within the spring is determined by the position of the plug 21 in its tapped hole. A screw-driver slot in the outer end of the plug 21 permits the adjustment of the position of the wire, and hence of the acceleration value at which the device is calibrated. In the arrangement shown, movement of the wire 20 from its mean position to either extreme position varies the calibration of the device by about 10% of its mean value. The calibrated value is a maximum when the wire 20 is in its extreme position with its maximum length within the tube 18, and a minimum when the wire 20 is screwed out of the tube 18 as far as possible.

The end cap 13 of the barrel 10 includes an expansion diaphragm 22 held in a recess in the end cap by an apertured plug 23. The joint between the cap 13 and the end face of the barrel is provided with a sealing ring 24. The electrical terminals in the device are constituted by the brass bush 15, which carries the terminal nut 25, and a terminal screw 26 screwed into a tapped hole in the barrel 10.

The interior of the barrel is completely filled with a silicone oil which serves to damp the vibration of the bob 19. The viscosity of this oil remains fairly constant with changes in temperature, so that its damping effect also remains constant. The diaphragm 22 allows the oil to expand in accordance with temperature variations without varying the static pressure within the barrel 10. If, as will usually be the case, the device is calibrated in the unfilled state, a correction for the buoyancy effect of the damping oil will be necessary in order to obtain the final calibration; this correction can be calculated from the specific gravities of the oil and of the material of the bob 19, or can be determined experimentally.

The holes in the ring contact 11 for securing screws 12 have large clearances to permit the centralisation of the ring contact 11 with reference to the contact 19 when the spring 18 is in its mean position. In calibrating the device in its unfilled state, the ring contact 11 is roughly centralised by eye and the calibration, in terms of the acceleration G due to gravity, determined for two diametrically opposite directions normal to the axial plane of the device. This is preferably done by securing the device in a centrifuge and determining the angular velocity at which the electrical circuit is completed. The mean of these values is then compared with the desired calibration (corrected for the absence of the buoyancy effect due to the damping fluid) and any necessary correction made by screwing the wire 20 into or out of the hollow spring 18. The process is then repeated until the desired accuracy of calibration is obtained. Altering the position of the wire 20 within the spring may cause the undeflected portion of the spring to shift slightly so that the ring contact 11 should, if necessary, be re-centralised by eye after each adjustment. For this reason also the ring contact 11 is accurately centralised with reference to the contact bob 19 only after the adjustment of the calibration has been finally completed: and re-centralisation of the ring contact may be necessary after any subsequent adjustment in service.

The preferred method of centralising the ring contact 11 is to connect the device in an electrical circuit and to determine the movement of the ring contact along the diameter necessary to move it between extreme positions in which it makes contact at opposite points with the bob 19: the ring contact is then moved from one extreme position for half this total movement. After approximately centralising along one diameter in this way, the ring contact is accurately centralised along a further diameter at right angles and finally re-centralised accurately along the first diameter. The screws 12 are then tightened to secure the ring contact in position: these screws, and the threaded adjusting plug 21, are preferably sealed before the final filling and testing of the device.

Of the variants possible in the construction shown, while retaining the essential features of the invention, particular mention may be made of constructions in which the stiffening wire 20 extends from the free end of the spring instead of from its anchored end. The threaded plug 21 then fits within a threaded bore in the contact bob 19 while the wire 20 extends through the non-deflecting portion of the spring 18, by which it is secured to the bob, into the flexible portion of the spring.

What I claim as my invention and desire to secure by Letters Patent is:

1. A mass-actuated electric switching device comprising a body resiliently supported by a hollow cantilever spring, a pair of co-operating contact surfaces relatively movable in response to transverse deflections of the spring between relatively engaged and disengaged positions, and a stiffening member extending through a non-deflecting portion of the spring into a flexible portion thereof and effective to modify the stiffness of the spring, at least the end of the stiffening member that is within the flexible portion being a close fit within the spring.

2. A mass-actuated electric switching device according to claim 1, wherein one contact surface of the said pair comprises part of the said body, the other contact surface comprising a fixed contact of the device.

3. A mass-actuated electric switching device according to claim 2, wherein the stiffening member is located longitudinally relative to the spring by means capable of permitting the variation of the length of that part of the stiffening member situated within the flexible portion of the spring.

4. A mass-actuated electric switching device according to claim 3, wherein the stiffening member is of circular cross section and the said means comprises a threaded member, connected with the stiffening member, situated beyond the said non-deflecting part of the spring and co-operating with a threaded part fixed relative to the spring.

5. A mass-actuated electric switching device according to claim 4, including a mounting member to which the end of the spring remote from the said body is secured and which is provided with a threaded bore for receiving the said threaded member associated with the stiffening member.

6. A mass-actuated electric switching device according to claim 5, wherein the fixed contact of the device is a ring contact surrounding the said body, and wherein the said spring is a tube of circular cross section.

References Cited in the file of this patent

UNITED STATES PATENTS

| | | |
|---|---|---|
| 1,588,900 | McGrath | June 15, 1926 |
| 1,846,966 | Hausse | Feb. 23, 1932 |
| 2,344,854 | Dempsey | Mar. 21, 1944 |
| 2,594,676 | Novak | Apr. 29, 1952 |
| 2,622,163 | Snell | Dec. 16, 1952 |
| 2,652,125 | Dewhirst | Sept. 15, 1953 |
| 2,662,945 | Cockram | Dec. 15, 1953 |

FOREIGN PATENTS

| | | |
|---|---|---|
| 443,335 | Great Britain | Feb. 26, 1936 |